(12) United States Patent
Spicer et al.

(10) Patent No.: US 8,166,945 B2
(45) Date of Patent: May 1, 2012

(54) STARTER AND ACCESSORY DRIVE SYSTEM AND METHOD FOR HYBRID DRIVE VEHICLES

(75) Inventors: Gary J. Spicer, Mississauga (CA); Zbyslaw Staniewicz, Mississauga (CA); Robert J. Laing, Moffat (CA); Larry J. Ferriman, Campbellville (CA)

(73) Assignee: Litens Automotive Partnership, Woodbridge (CA)

(*) Notice: Subject to any disclaimer, the term of this patent is extended or adjusted under 35 U.S.C. 154(b) by 141 days.

(21) Appl. No.: 12/531,501

(22) PCT Filed: Mar. 20, 2008

(86) PCT No.: PCT/CA2008/000550
§ 371 (c)(1),
(2), (4) Date: Sep. 16, 2009

(87) PCT Pub. No.: WO2008/113186
PCT Pub. Date: Sep. 25, 2008

(65) Prior Publication Data
US 2010/0065001 A1  Mar. 18, 2010

(51) Int. Cl.
*F02N 15/02* (2006.01)
(52) U.S. Cl. ............... 123/179.28; 123/179.25
(58) Field of Classification Search ............ 123/198 R, 123/179.3, 179.4, 179.25, 179.28, 90.31; 180/65.21, 65.31; 290/31, 32, 34, 40 R, 290/46–48, 51
See application file for complete search history.

(56) References Cited

U.S. PATENT DOCUMENTS

| | | | |
|---|---|---|---|
| 4,854,192 A | 8/1989 | Churchill | |
| 4,917,225 A | 4/1990 | Diehl et al. | |
| 5,139,468 A | 8/1992 | Churchill et al. | |
| 5,896,750 A | 4/1999 | Karl | |
| 6,453,865 B2 * | 9/2002 | Hirose et al. | 123/179.4 |
| 6,478,005 B2 * | 11/2002 | Tsubouchi | 123/195 P |
| 6,554,113 B2 | 4/2003 | Li et al. | |
| 6,781,252 B2 | 8/2004 | Berels | |
| 6,793,059 B2 * | 9/2004 | Okada et al. | 192/84.1 |

(Continued)

FOREIGN PATENT DOCUMENTS
EP  1361092  11/2006
(Continued)

OTHER PUBLICATIONS
International Preliminary Report on Patentability regarding Application No. PCT/CA2008/000550, issued Sep. 22, 2009.

*Primary Examiner* — Hai Huynh
(74) *Attorney, Agent, or Firm* — Harness, Dickey & Pierce, P.L.C.

(57) ABSTRACT

A starter and accessory drive system and method for hybrid drive vehicles is provided. The invention isolates the accessory drive system from the transfer of torque between a starter motor and the crankshaft of the engine. In one embodiment, a dedicated flexible drive member transfers torque from the starter motor to the crankshaft to re-start the engine. In another embodiment, a torque transfer control is employed to selectively apply torque from the starter motor to the accessory drive, to drive the accessories when the engine is stopped, and/or to the engine crankshaft to re-start the engine. In another embodiment of the invention, the accessory drive is isolated from the engine crankshaft and is instead driven by a drive motor on the accessory drive while the engine crankshaft is connected to a starter motor and/or generator which can be energized to re-start the engine.

21 Claims, 11 Drawing Sheets

U.S. PATENT DOCUMENTS

| | | |
|---|---|---|
| 6,848,552 B2 | 2/2005 | Miller |
| 6,863,139 B2 | 3/2005 | Egami et al. |
| 6,895,744 B2 | 5/2005 | Osawa |
| 7,013,646 B1 | 3/2006 | Serkh et al. |
| 7,024,858 B2 | 4/2006 | Gray Jr. |
| 7,032,385 B2 | 4/2006 | Gray, Jr. |
| 7,099,768 B2 * | 8/2006 | Moriya .................. 701/112 |
| 7,114,585 B2 | 10/2006 | Man et al. |
| 7,506,711 B2 * | 3/2009 | Usoro .................. 180/65.23 |
| 7,582,034 B2 * | 9/2009 | Usoro .................. 475/5 |
| 7,695,400 B2 * | 4/2010 | McGee .................. 477/5 |
| 7,726,275 B2 * | 6/2010 | Deniston et al. ........ 123/198 R |
| 2002/0062806 A1 * | 5/2002 | Suzuki .................. 123/179.3 |
| 2003/0116368 A1 | 6/2003 | Winkelman et al. |
| 2003/0209373 A1 | 11/2003 | Egami et al. |
| 2003/0221656 A1 * | 12/2003 | Kitamura et al. ........ 123/198 R |
| 2004/0206594 A1 | 10/2004 | Miller |
| 2005/0022770 A1 * | 2/2005 | Yumiyama et al. ........ 123/179.4 |
| 2006/0019786 A1 | 1/2006 | Asa et al. |
| 2006/0107920 A1 * | 5/2006 | Serkh et al. ........ 123/198 R |
| 2006/0116797 A1 | 6/2006 | Moran |
| 2006/0174624 A1 | 8/2006 | Grabowski et al. |
| 2007/0068476 A1 | 3/2007 | Asada |
| 2007/0080037 A1 | 4/2007 | Larry et al. |
| 2007/0130950 A1 * | 6/2007 | Serkh et al. .......... 60/698 |
| 2007/0186896 A1 * | 8/2007 | Carroll et al. ......... 123/198 R |
| 2007/0213151 A1 | 9/2007 | Usoro |
| 2008/0020875 A1 | 1/2008 | Serrels et al. |
| 2008/0047800 A1 | 2/2008 | Borgerson et al. |
| 2008/0051242 A1 | 2/2008 | Usoro |
| 2008/0149405 A1 | 6/2008 | Hladun et al. |
| 2009/0188459 A1 * | 7/2009 | Fleckner et al. ........ 123/179.3 |
| 2009/0255741 A1 * | 10/2009 | Major et al. ........ 180/65.22 |
| 2010/0031910 A1 * | 2/2010 | Seufert et al. ........ 123/179.3 |

FOREIGN PATENT DOCUMENTS

| | | |
|---|---|---|
| WO | 9731198 A1 | 8/1997 |
| WO | 02097290 A2 | 12/2002 |

* cited by examiner

STARTER AND ACCESSORY DRIVE SYSTEM AND METHOD FOR HYBRID DRIVE VEHICLES

FIELD OF THE INVENTION

The present invention relates to a starter and accessory drive system and method. More specifically, the present invention relates to a starter and accessory drive system and method for hybrid drive vehicles.

BACKGROUND OF THE INVENTION

Vehicles with hybrid drive systems have become one important way of reducing vehicular emissions and improving fuel economy. Various specific hybrid drive systems have been proposed and/or built and many of these hybrid drive systems employ a start-stop strategy wherein the internal combustion engine in the vehicle is stopped when not needed and is re-started as needed.

While such start-stop strategies make a significant contribution to achieving the reduced emissions and improved fuel economy goals of hybrid vehicles, the implementation of start-stop strategies suffers from several problems.

One of these problems is the fact that the conventional starter motor and ring gear starting system which is commonly employed on most internal combustion engines is not designed to survive the much higher number of starter cycles expected over the lifetime of a hybrid drive system. Specifically, a typical starter motor and ring gear starting system is designed to reliably perform as many as fifty thousand starting cycles over the lifetime of a vehicle. In contrast, it is estimated that the internal combustion engine in a hybrid vehicle employing a start-stop strategy must be started as many as eight hundred thousand times over the lifetime of the vehicle and thus conventional starter and ring gear systems can be woefully inadequate.

In an attempt to avoid failures of the conventional starter and ring gear system, some hybrid drives employing start-stop strategies have been equipped with an alternator/motor on their accessory drive (either a Front Engine Accessory Drive—FEAD, or a Rear Engine Accessory Drive—READ). With such systems, the conventional starter motor and ring gear is used to start the internal combustion engine in conditions requiring high starting torques (such as starting of the vehicle before normal operating temperatures have been achieved) but is re-started after a short term shutdown (or when the vehicle is otherwise at normal operating temperatures) with the alternator/motor which generates the necessary torque to turn the crankshaft of the engine and that torque is transferred from the alternator/motor to the crankshaft by the accessory drive belt.

While such alternator/motor systems do work, they also suffer from disadvantages. In particular, as the torque necessary to rotate the crankshaft and start the internal combustion engine can easily exceed one hundred and forty Newton meters, the accessory belt must be much stronger than would otherwise be required and the tension of that belt also must be much higher than would other wise be required. Further, to achieve the necessary belt strength, the belt must typically be thicker and/or wider, thus occupying more space which may not be readily available.

Due to the required higher tension in the accessory drive belt, each of the accessories on the accessory drive must have more robust bearings and mounting hardware, increasing the manufacturing cost of the vehicle, and parasitic losses in the belt, which result in fuel economy decreases, are increased with the tension and with the associated increased stiffness of the belt.

Further, as the accessory drive is tensioned in one direction when the internal combustion engine is running and is tensioned in the other direction when the internal combustion engine is being started by the alternator/motor, the accessory drive design will require special purpose idlers and/or tensioners and may require multiple instances of such tensioners and/or idlers, all of which further increases the manufacturing expense of the vehicle.

Another problem which exists with hybrid drives that employ start-stop strategies is that, when the internal combustion engine is stopped, the accessory drive system is not operating. Thus, accessories powered by the accessory drive, such as the power steering pump, air conditioning compressor, alternator, etc. are not operating. The non-operation of these accessories can reduce the comfort level of the occupants of the vehicle and, in the case of the power steering pump, can lead to unsafe operating conditions.

It is desired to have a method and system for re-starting and/or operating vehicles with hybrid drives that employ start-stop strategies.

SUMMARY OF THE INVENTION

It is an object of the present invention to provide a novel starter and accessory drive system and method for hybrid drive vehicles which obviates or mitigates at least one disadvantage of the prior art.

According to a first aspect of the present invention, there is provided a starter and accessory drive system for vehicles employing a start-stop strategy, comprising: a drive pulley rotating with the engine of the vehicle; at least one accessory driven by a first flexible drive member engaging the drive pulley; a starter motor operable to create sufficient torque to rotate the engine to re-start the engine; and a second flexible drive member operable to transfer the torque produced by the starter motor to the drive pulley to re-start the engine.

According to a second aspect of the present invention, there is provided a starter and accessory drive system for vehicles employing a start-stop strategy, comprising: a drive pulley rotating with the engine; a starter motor operable to create sufficient torque to rotate the engine to re-start the engine; at least one accessory driven by a first flexible drive member; and a torque transfer and control member including a first surface to engage the first flexible drive member, a second surface to engage a second flexible drive member rotating with the drive pulley and a third surface to engage a third flexible drive member to receive torque produced by the starter motor, the first surface rotating with the second surface and the torque transfer and control including a clutch to lock the rotation of the second surface to the rotation of the first surface when engaged to allow the second surface to rotate independently of the first surface and the third surface when disengaged, the starter motor providing torque to drive the accessory when the engine is stopped and the clutch is disengaged and providing torque to re-start the engine when the clutch is engaged.

According to yet another aspect of the present invention, there is provided a system for re-starting an internal combustion engine used with a hybrid drive vehicle employing a start-stop strategy, comprising: a drive pulley including a first surface to engage a first flexible drive member, the first surface rotating with the engine, and a second surface to engage a second flexible drive member, the second surface rotating independently of the rotation of the engine; at least one accessory driven by the second flexible drive member; and an electric drive motor operable to produce torque to drive the at least one accessory via the second flexible drive member independent of the operation of the engine; and a starter motor operable to create sufficient torque to rotate the engine to re-start the engine, the torque being transferred from the starter motor to the drive pulley via the first flexible drive member.

According to yet another aspect of the present invention, there is provided a method of operating at least one accessory in a vehicle employing a start-stop strategy for the operation of the internal combustion engine of the vehicle, comprising the steps of: (i) powering the at least one accessory via a first flexible drive means connected to a pulley rotated by the crankshaft of the engine; and (ii) restarting the engine of the vehicle after it has been stopped with a starter motor connected to the crankshaft of the engine via a second flexible drive means.

The present invention provides a novel system and method for operating hybrid drive vehicles employing start-stop strategies. The present invention can isolate the accessory drive system from the transfer of torque between a starter motor and the crankshaft of the engine. In one embodiment, a dedicated flexible drive member transfers torque from the starter motor to the crankshaft to re-start the engine. A clutch can be provided to disengage the starter motor once the engine has started and/or the starter motor can also function as an alternator or generator. In another embodiment, a torque transfer control (TTC) is employed to selectively apply torque from the starter motor to the accessory drive, to drive the accessories when the engine is stopped, and/or to the engine crankshaft to re-start the engine. The starter motor can be disengaged, once the engine has started, and the accessories can then be driven by the engine. In another embodiment of the invention, the accessory drive is isolated from the engine crankshaft and is instead driven by a drive motor on the accessory drive while the engine crankshaft is connected to a starter motor which can be operated to re-start the engine.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
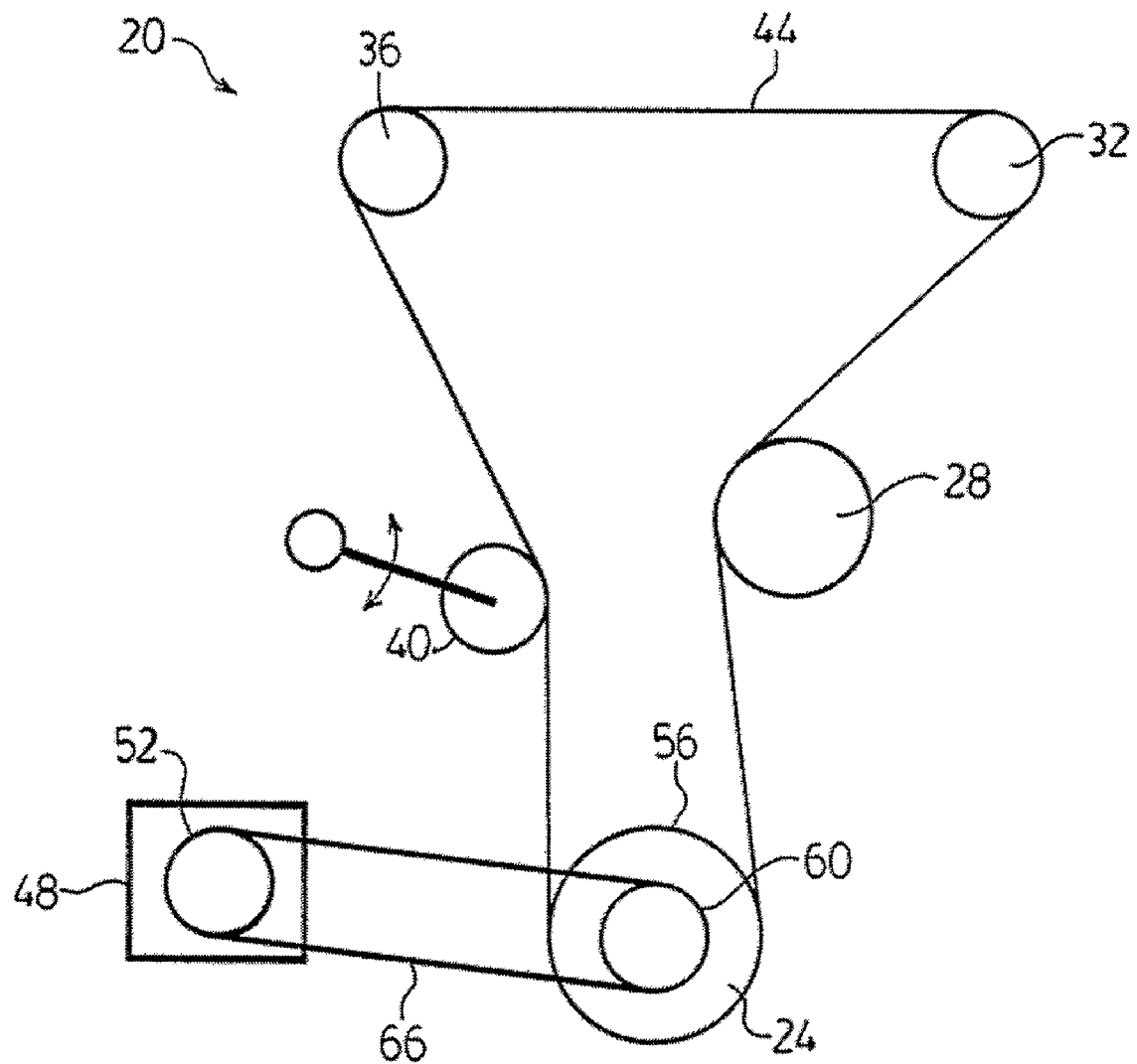
FIG. 1 shows a schematic representation of an accessory drive system in accordance with the present invention.

A front engine accessory drive (FEAD), for a vehicle employing a hybrid drive, in accordance with a first embodiment of the present invention, is indicated generally at 20 in FIG. 1. While the following discussion only mentions FEAD systems, the present invention can also be employed with rear engine accessory drive (READ) systems, if desired, and such systems are intended to be within the claimed scope of the present invention. In READ systems, the accessory drive is driven by the crankshaft either directly or indirectly, such as by a camshaft or power take off shaft which is ultimately driven by the crankshaft. Accordingly, in the following discussion, references to a crankshaft being driven, or driving, are intended to include both direct connections to the crankshaft and such indirect connections, whether in FEAD or READ systems.

In the illustrated embodiment, FEAD 20 comprises a crankshaft pulley 24, which in many cases will include some form of a vibration damper, a water pump 28, an alternator 32, a power steering pump 36 and a tensioner 40. As will be apparent to those of skill in the art, the present invention is not limited to FEAD systems with these accessories and, instead, the present invention can be employed with FEAD or READ systems with any accessories, including engine cooling fans, air conditioning compressors, hydraulic pumps, pneumatic pumps, etc.

A flexible drive member, which in the illustrated embodiment is a flexible belt 44, engages each of the crankshaft pulley 24 and the above-mentioned accessories such that rotation of the crankshaft of the engine rotates the input pulley of each corresponding accessory, thus powering the accessories.

While the discussion herein only refers to belts as the flexible drive members, it will be apparent to those of skill in the art that the present invention is not limited to the use of belts or chains and that any other suitable method of transferring torque between devices can be employed if desired. In particular, it is contemplated that V-Belts, toothed belts, chains, trains of gears, etc. can be used as flexible drive members with the present invention.

FEAD 20 further comprises a starter motor 48 that includes a drive pulley 52 which is driven by starter motor 48. Starter motor 48 can be any suitable starter motor and can operate from any suitable energy source, such as a 12V DC, 48V DC or 300V DC supply, or an inertial store, such as a flywheel, or a source of hydraulic or pneumatic pressure. Starter motor 48 is selected and designed to meet or exceed the expected number of operating cycles over the lifetime of the vehicle in which FEAD system 20 is installed.

As illustrated, crankshaft pulley 24 includes a first flexible drive member engaging surface 56, which engages belt 44, and further includes a second flexible drive member engaging surface 60, which is coaxially aligned with first flexible drive member engaging surface 56.

It is contemplated that second flexible drive member engaging surface 60 can be provided by suitably affixing a second pulley to the conventional vibration damper supplied with the engine, or a purpose-built vibration damper can be installed on the engine, the purpose-built vibration damper providing both first flexible drive member engaging surface 56 and second flexible drive member engaging surface 60.

A second flexible drive member 66 connects drive pulley 52 of starter motor 48 and second flexible drive member engaging surface 60 of crankshaft pulley 24.

As will now be apparent to those of skill in the art, when the engine on which FEAD 20 is to be re-started, after having been stopped by the hybrid drive controller system or other mechanism, starter motor 48 can be energized to rotate drive pulley 52 and, via second flexible drive member 66, to rotate crankshaft pulley 24 to re-start the engine.

FEAD system 20 provides several advantages over known systems for re-starting hybrid drives. In particular, as the relatively high torque levels which need be applied to crankshaft pulley 24 are transferred from starter motor 48 by second flexible drive member 66, flexible drive member 44 is not subjected to those high levels of torque and thus the tension of flexible drive member 44 can be set at conventional levels rather than the much higher levels which would be required to transfer starting torque from starter motor 48 to crankshaft pulley 24.

Further, by avoiding the need to utilize high levels of tension in flexible drive member 44, the crankshaft and the accessories of FEAD 20 are not subject to the associated high bearing loadings which would otherwise have resulted and the mounting hardware of the accessories likewise is not subjected to the high loadings which would otherwise have resulted.

Another advantage of FEAD system 20 is that it is contemplated that it can relatively easily be retrofitted to existing engines and vehicles without requiring undue modification of the engine or FEAD components, with the exception of replacing, or modifying, crankshaft pulley 24 and mounting and wiring starter motor 48. However, as will be apparent to those of skill in the art, in such a case the lateral loads on the engine crankshaft which result from the torque transferred by second flexible drive member 66 could exceed those contemplated by the original design of the engine and care must be taken to prevent damage to the crankshaft and/or engine.

In such case, it is contemplated that crankshaft pulley 24 can be equipped with a suitable means for handling these loads to prevent damage or wear of the crankshaft. For example, crankshaft pulley 24 can be supported by a bearing in a suitably supported mount such that the lateral loads are substantially transferred to the mount and not to the crankshaft. A specific example of a crankshaft pulley 24 equipped with a mounting system to handle such lateral loads is discussed below with respect to FIGS. 9 and 10. However, the present invention is not so limited and any suitable method for accommodating such lateral loads can be employed, as will occur to those of skill in the art, if necessary.

With the embodiment of FEAD 20 as described above, drive pulley 52 of starter motor 48 always rotates with crankshaft pulley 24. Thus, when the engine is operating, starter motor 48 is being turned by the engine. It is contemplated that, if desired, starter motor 48 can be a motor/generator and can generate electrical current when the engine is running. This electrical current can be used to augment the electrical current produced by alternator 32, or can serve as a separate electrical current source, for example at a different voltage, if desired.

However, it is also contemplated that it may be desired that starter motor 48 not rotate with crankshaft pulley 24, other than when being employed to re-start the engine. In such a case, a one-way clutch can be provided on drive pulley 52 (disengaging drive pulley 52 from starter motor 48) or on crankshaft pulley 24 (disengaging second flexible drive engaging surface 60 from rotation with crankshaft pulley 24) to allow starter motor 48 to be disengaged from crankshaft pulley 24, other than when starter motor 48 is being used to re-start the engine. Any appropriate mechanical or electrically controlled clutch, as will occur to those of skill in the art, can be employed for this purpose.

While the embodiment of FEAD 20 described above can be quite effective at re-starting an engine, the problem of the stopping of the FEAD-driven accessories when the engine is stopped is not addressed.

Accordingly, it is further contemplated that, in another embodiment of the present invention, crankshaft pulley 24 can be equipped with a clutch which, when engaged, locks the rotation of crankshaft pulley 24 to the rotation of the engine crankshaft and which, when disengaged, allows the free rotation of crankshaft pulley 24 from the engine crankshaft. In this embodiment, when the engine is stopped, the clutch on crankshaft pulley 24 will be disengaged and starter motor 48 will be energized, rotating drive pulley 52. The torque from drive pulley 52 will be transferred to crankshaft pulley 24, via second flexible drive means 66, and crankshaft pulley 24 will freely rotate on the engine crankshaft and will drive the FEAD accessories via rotation of belt 44. Thus, the FEAD-driven accessories can be operated independent of the operation of the engine.

With this embodiment, when it is desired to re-start the engine, the clutch on crankshaft pulley 24 can be engaged to lock rotation of crankshaft pulley 24 with rotation of the engine crankshaft and the torque from starter motor 48 will be applied to the engine crankshaft via second belt 66 and crankshaft pulley 24 to re-start the engine. A specific embodiment of such a crankshaft pulley 24 is described below, with reference to FIGS. 9 and 10.

If desired, in addition to the above-described clutch on crankshaft pulley 24, a second clutch can be provided between starter motor 48 and drive pulley 52, as described previously, to allow starter motor 48 to be disengaged from drive pulley 52 so that starter motor 48 is not rotated when the engine is operating normally.

It is contemplated that, in many circumstances, due to the required high torque carrying level, it can be difficult to provide the above-described clutch for crankshaft pulley 24 in the space available without requiring extensive redesign of the engine and/or engine compartment of the vehicle. Accordingly, another FEAD system in accordance with another embodiment of the present invention, is indicated generally at 100 in FIG. 2, wherein like components to those of FIG. 1 are indicated with like reference numerals.

In this embodiment, a conventional crankshaft drive pulley 104, typically in the form of a torsional vibration damper, is affixed to the engine crankshaft and includes a single flexible drive-engaging surface which a flexible drive 108, such as a belt, engages.

As illustrated, a torque transfer control unit (TTC) 112 is mounted to the engine, adjacent to crankshaft drive pulley 104. TTC 112 includes a first flexible drive engaging surface 116, a second flexible drive engaging surface 120 and a third flexible drive engaging surface 124. As described below, TTC 112 operates to allow the selective transfer of torque between flexible drive 66, flexible drive 108 and flexible drive 44, as described below.

Specifically, TTC 112 includes a set of clutches which preferably allows the selective engagement and disengagement of first flexible drive engaging surface 116, second flexible drive engaging surface 120 and third flexible drive engaging surface 124 to each other. The clutches in TTC 112 can be controlled in any suitable manner, as will occur to those of skill in the art, including mechanical control and/or electronic control.

As illustrated, drive pulley 52 of starter motor 48 is coupled to third flexible drive engaging surface 124 by flexible drive 66. Crankshaft drive pulley 104 is coupled to second flexible drive engaging surface 120 by flexible drive 108 and the FEAD accessories are coupled to first flexible drive engaging surface 116 by flexible drive 44.

When the engine is stopped but it is desired to operate the FEAD accessories, the clutches in TTC 112 are set such that the rotation of first flexible drive engaging surface 116 is locked to the rotation of third flexible drive engaging surface 124, while second flexible drive engaging surface 120 is allowed to freewheel. Starter motor 48 is energized to rotate drive pulley 52, flexible drive 66 and third flexible drive engaging surface 124 which, in turn, rotates first flexible drive engaging surface 116 and flexible drive 44, thus operating the FEAD accessories.

When it is desired to re-start the engine, the clutches in TTC 112 are set such that the rotation of second flexible drive engaging surface 120 is also locked to the rotation of first flexible drive engaging surface 116 and third flexible drive engaging surface 124. Flexible drive 66 thus transfers torque from starter motor 48 to crankshaft drive pulley 104 through belt 108 to rotate the engine crankshaft to re-start the engine while still operating the FEAD accessories.

When the engine is running normally, the clutches in TTC 112 are set to lock the rotation of first flexible drive engaging surface 116 to the rotation of second flexible drive engaging surface 120, while third flexible drive engaging surface 124 is allowed to freewheel. In this manner, torque is transferred from the engine crankshaft via flexible drive 108 to the FEAD accessories via flexible drive 44.

With the clutch system in TTC 112, it is also contemplated that, if desired, starter motor 48 can be used to cold start the engine, either in addition to or instead of, the conventional starter motor and ring gear starter system. In such a case, the FEAD accessories need not be operated until the engine is started. Thus, the clutches in TTC 112 can be set such that the rotation of third flexible drive engaging surface 124 is locked to the rotation of second flexible drive engaging surface 120, while first drive engaging surface 116 is set to freewheel. By allowing first drive engaging surface 116 to freewheel, substantially all of the torque generated by starter motor 48 will be transferred to the engine crankshaft, as the FEAD accessories will not be operated during the cold start cranking of the engine.

Once the engine is started, the clutches in TTC 112 can be set to lock the rotation of first flexible drive engaging surface 116 to the rotation of second flexible drive engaging surface 120, while third flexible drive engaging surface 124 is allowed to freewheel as starter motor 48 is de-energized.

In an alternative embodiment, a somewhat simpler implementation of TTC 112 is contemplated. In this embodiment, the rotation of third flexible drive engaging surface 124 is always locked to the rotation of first flexible drive engaging surface 116 and thus flexible drive 66 and FEAD flexible drive 44 always rotate together.

When the engine is stopped and it is desired to operate the FEAD accessories, starter motor 48 is energized and the torque generated by starter motor 48 is transferred to the FEAD accessories via flexible drives 66 and 44.

When it is desired to re-start the engine, the clutches in TTC 112 are set to lock the rotation of second flexible drive means engaging surface 120 to the rotation of first flexible drive means engaging surface 116 and third flexible drive means engaging surface 124 and torque produced by starter motor 48 is supplied to the engine crankshaft, as well as to the FEAD accessories.

Once the engine has re-started, starter motor 48 is de-energized, but continues to rotate with first flexible drive means engaging surface 116 and second flexible drive means engaging surface 120. If starter motor 48 is a motor-generator, starter motor 48 can produce an electric current for use in the vehicle.

If desired, a clutch can be provided between starter motor 48 and drive pulley 52 to allow starter motor 48 to be disengaged from drive pulley 52, which is rotated by flexible drive 66, when the engine is operating.

Figure 2:
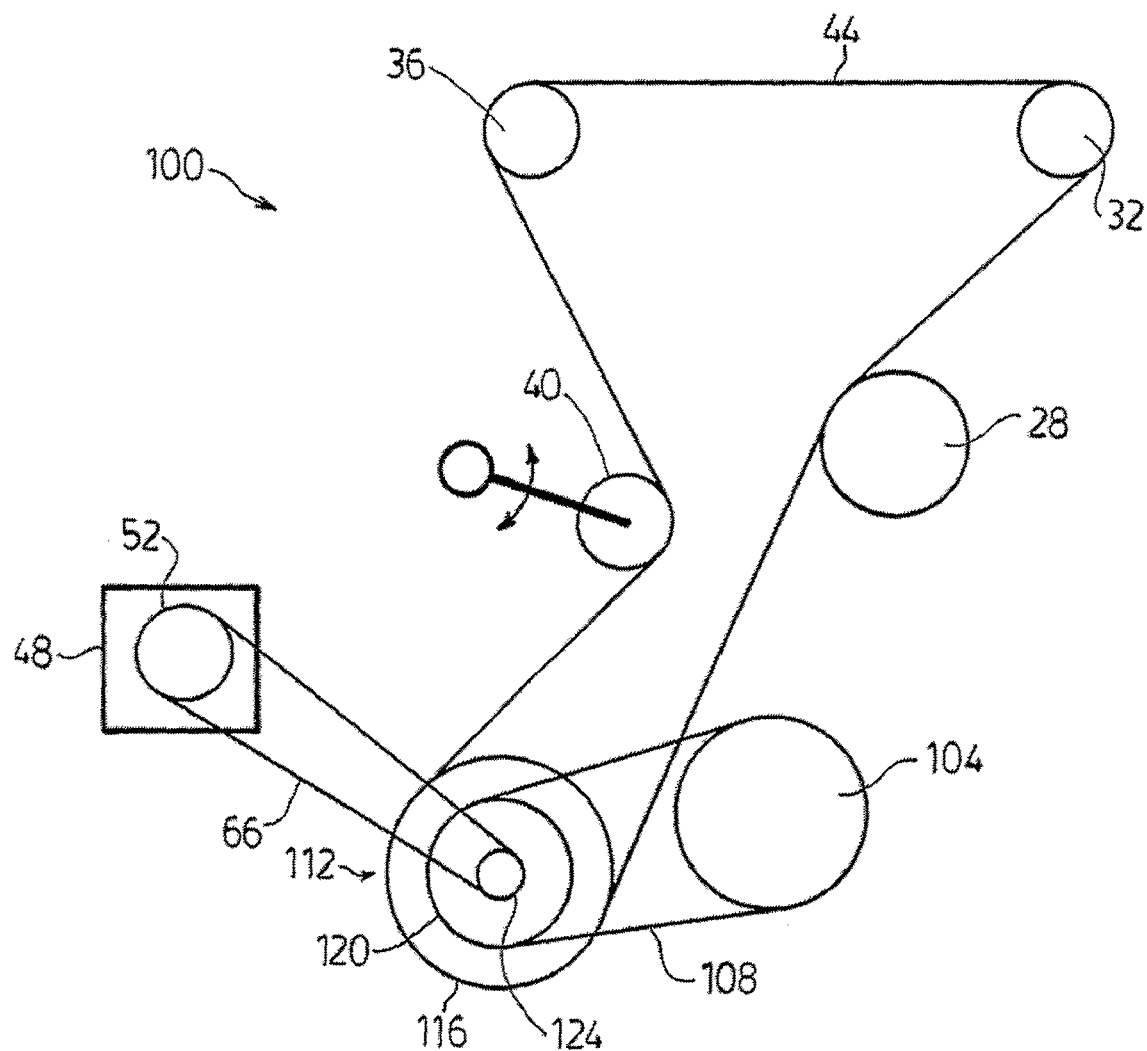
FIG. 2 shows a schematic representation of another accessory drive system in accordance with the present invention.
Figure 3:
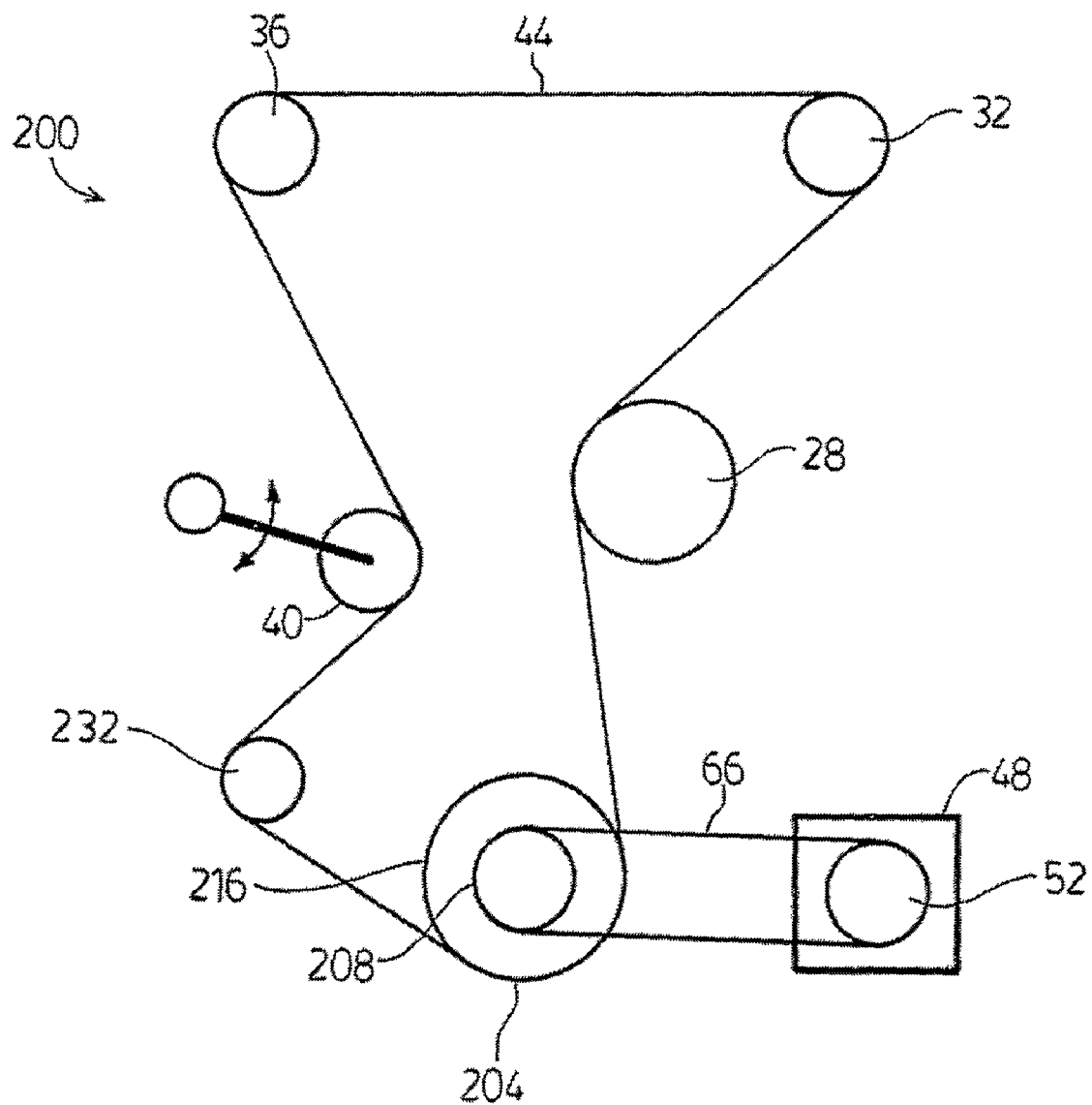
FIG. 3 shows a schematic representation of another accessory drive system in accordance with the present invention.

Yet another embodiment of the present invention is disclosed with reference to FIG. 3, where an accessory drive (FEAD or READ) system in accordance with the present invention is indicated generally at 200 and wherein like components to those of FIGS. 1 and 2 are indicated with like reference numerals.

Figure 4:
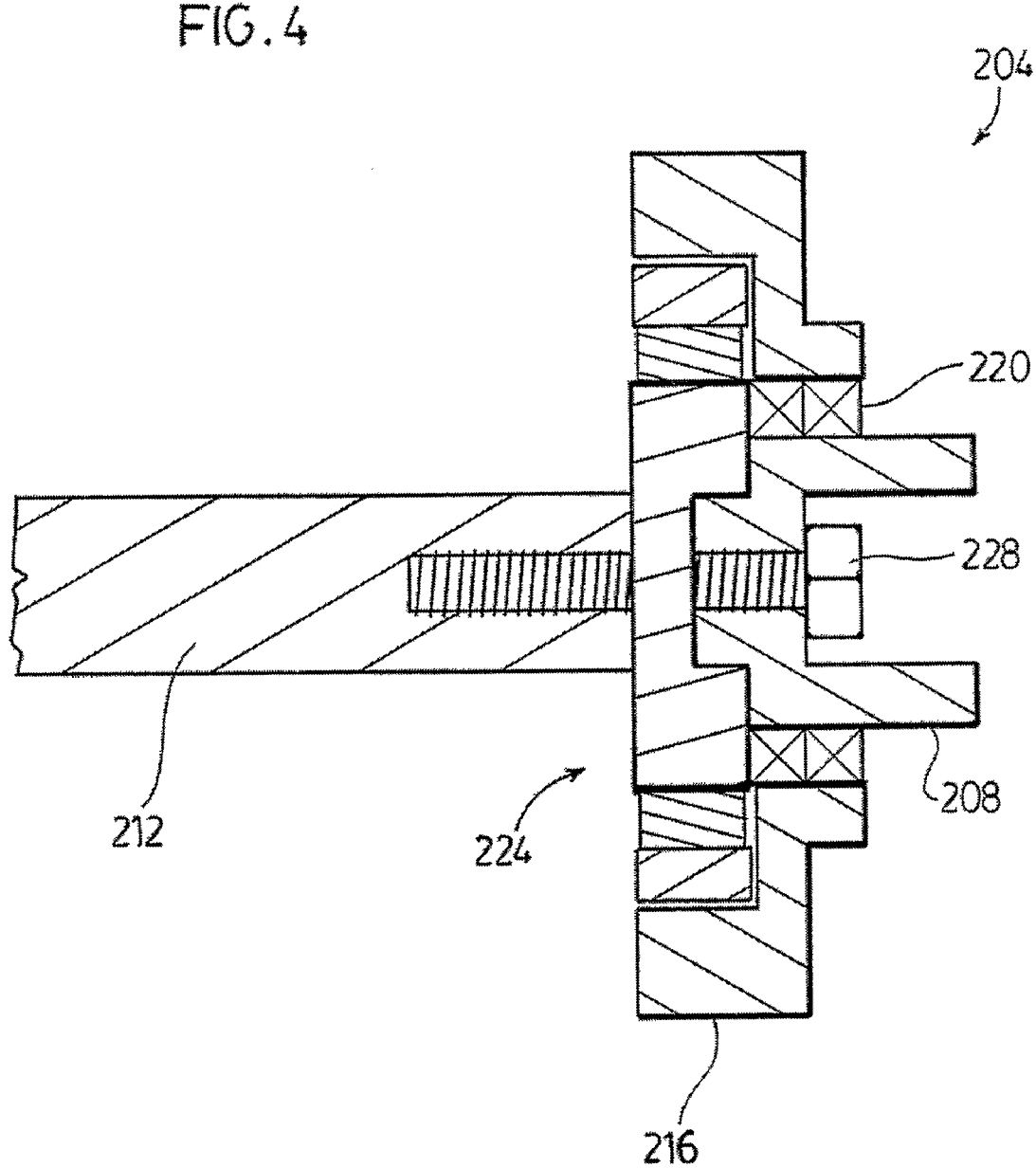
FIG. 4 shows a cross section through a crankshaft pulley employed with the accessory drive system of FIG. 3.

System 200 includes a crankshaft pulley 204, best seen in FIG. 4, which includes a first flexible drive engaging surface 208, which rotates with the engine crankshaft 212 on which pulley 204 is mounted, and a second flexible drive engaging surface 216 which freewheels, with respect to crankshaft 212, on a bearing 220 that rides on a hub portion of first flexible drive engaging surface 208.

The illustrated embodiment of pulley 204 is intended for retrofitting over an existing torsional vibration damper 224, allowing system 200 to be retrofitted to an existing vehicle, and first flexible drive engaging surface 208 is affixed to crankshaft 212 via a bolt 228, which is somewhat longer than the bolt originally holding vibration damper 224 on crankshaft 212 to accommodate the thickness of first flexible drive engaging surface 208. Also, when retrofitting system 200 to an existing vehicle, second flexible drive engaging surface 216 has the same axis of rotation, substantially the same outer diameter and the same centerline as the original crankshaft drive pulley that crankshaft pulley 204 replaces and thus few, if any, changes are required to the existing accessory drive system.

Referring again to FIG. 3, flexible drive 66 links first flexible drive engaging surface 208 with drive pulley 52 of starter motor 48. When it is desired to restart the engine, starter motor 48 is activated and the torque it produces is transferred via belt 66 to first flexible drive engaging surface 208 to rotate crankshaft 212 and start the engine. If desired, a clutch can be provided between starter motor 48 and drive pulley 52 to allow starter motor 48 to be disengaged from drive pulley 52, which is rotated by belt 66, when the engine is operating.

Unlike the embodiments of the present invention described above, in system 200 the accessory drive is isolated from crankshaft 212, by freewheeling second flexible drive engaging surface 216, and is never directly driven by rotation of crankshaft 212.

Instead, in accessory drive system 200 an accessory drive motor 232 is provided. Drive motor 232 can be any suitable motor and can operate from any suitable energy source, such as a 12V DC, 48V DC or 300V DC supply, or an inertial store, such as a flywheel, or a source of hydraulic or pneumatic pressure. When drive motor 232 is activated, it rotates belt 44 to power the accessories. In the event of a failure of drive motor 232, it is contemplated that a temporary locking mechanism (not shown) can be provided for crankshaft pulley 204 to allow second flexible drive engaging surface 216 to be locked to first flexible drive engaging surface 208 to provide a "limp home" functionality, allowing the vehicle to be driven to a repair center.

The use of drive motor 232 to operate the accessory drive driven accessories provides significant advantages over conventional crankshaft-driven accessory drive systems. Specifically, in conventional crankshaft-driven FEAD or READ systems, the accessories must be designed to operate over the expected wide range of operating speeds which result from changes in the crankshaft rotational speed as the engine speed increases and decreases. The need to design the accessories to accommodate the expected range of operating speeds results in a variety of compromises which typically increase the cost of manufacture of the accessories and which typically results in various energy losses in the accessory system, reducing the fuel economy of the vehicle in which the engine is installed.

For example, accessories such as power steering pumps and air conditioning compressors must be designed to provide needed levels of service when the engine is idling and thus these accessories typically over produce their levels of service when the engine is operated at speeds above idle. These overproduced pressures or flows are typically wasted, through a waste gate or equivalent, and result in a significant loss of energy, reducing fuel efficiency of the engine. Similarly, to accommodate the upper end of the expected operating speed range, the tension of the drive belt in the accessory system must be higher than would otherwise be needed, thus resulting in the loss of energy efficiency due to parasitic losses in the drive belt.

In contrast, in the present invention, drive motor 232 can be operated at a selected operating speed which is constant, or in a selected range of speeds, independent of the operating speed of the engine. Thus, the designers of the accessories can design each accessory to be operated at a single speed, or reduced range of speeds, and typically this will enable the accessories to be defined to higher levels of efficiency.

Further, as accessory drive system 200 is isolated from the crankshaft, system 200 will not be subject to torsional vibrations from the crankshaft of the engine and thus the design of tensioner 40, any idlers (if required) and the accessories can be simplified and their expected operating lifetimes can be increased.

Further still, the necessary accessory drive belt tension, can be reduced compared to the tension levels typically required for variable speed accessory drive systems and accessory drive systems subject to torsional vibrations, resulting in a reduction of the tension related parasitic losses in the flexible drive.

Figure 5:
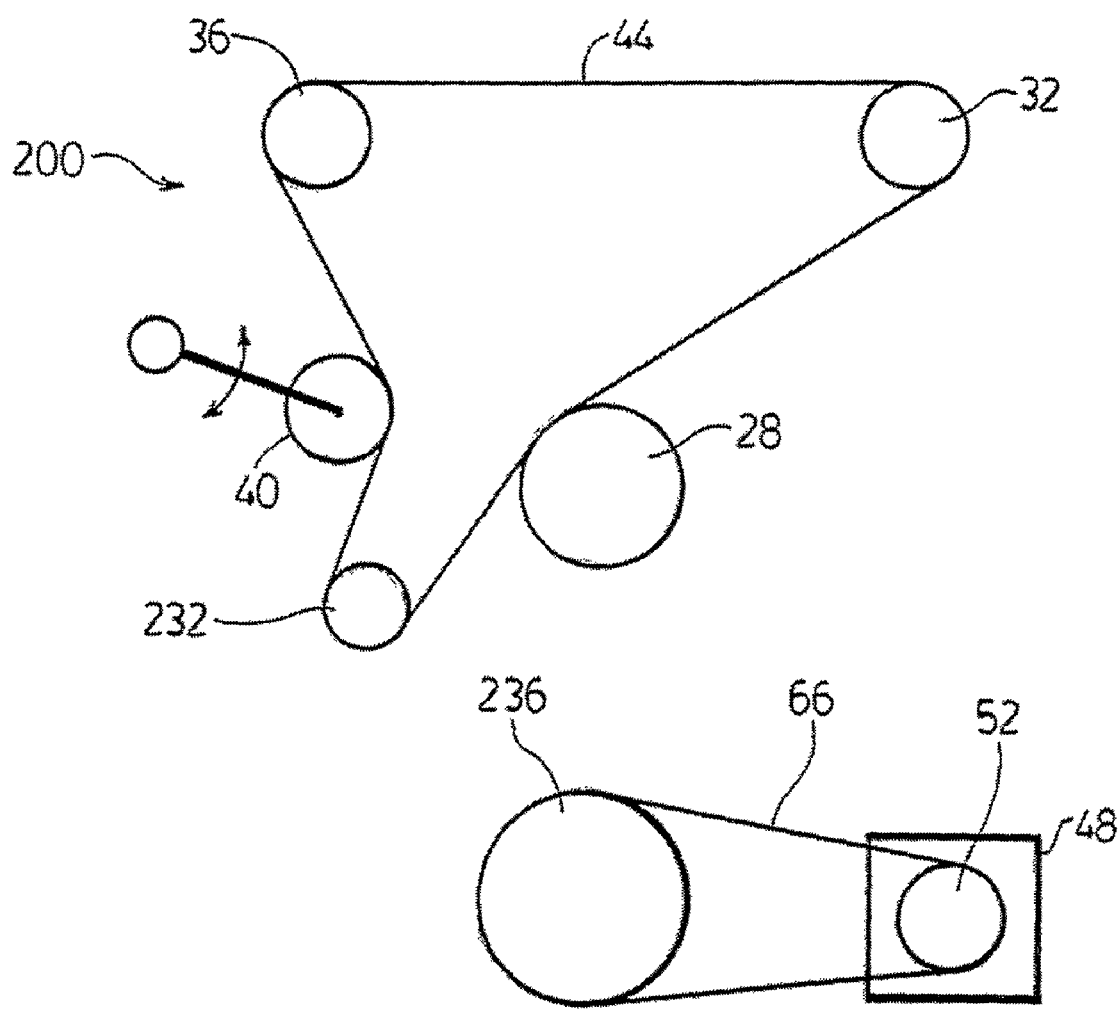
FIG. 5 shows a schematic representation of an alternative configuration of the accessory drive system of FIG. 3.

While system 200 of FIG. 3 is shown as being suitable for retrofitting to an existing vehicle, this embodiment of the present invention is not so limited. FIG. 5 shows another implementation of system 200 wherein starter motor 48 is linked to a conventional crankshaft pulley 236 via flexible drive 66. In this embodiment, flexible drive 44 drives the accessories from drive motor 232, and is routed to not contact crankshaft pulley 236 at all.

Figure 6:
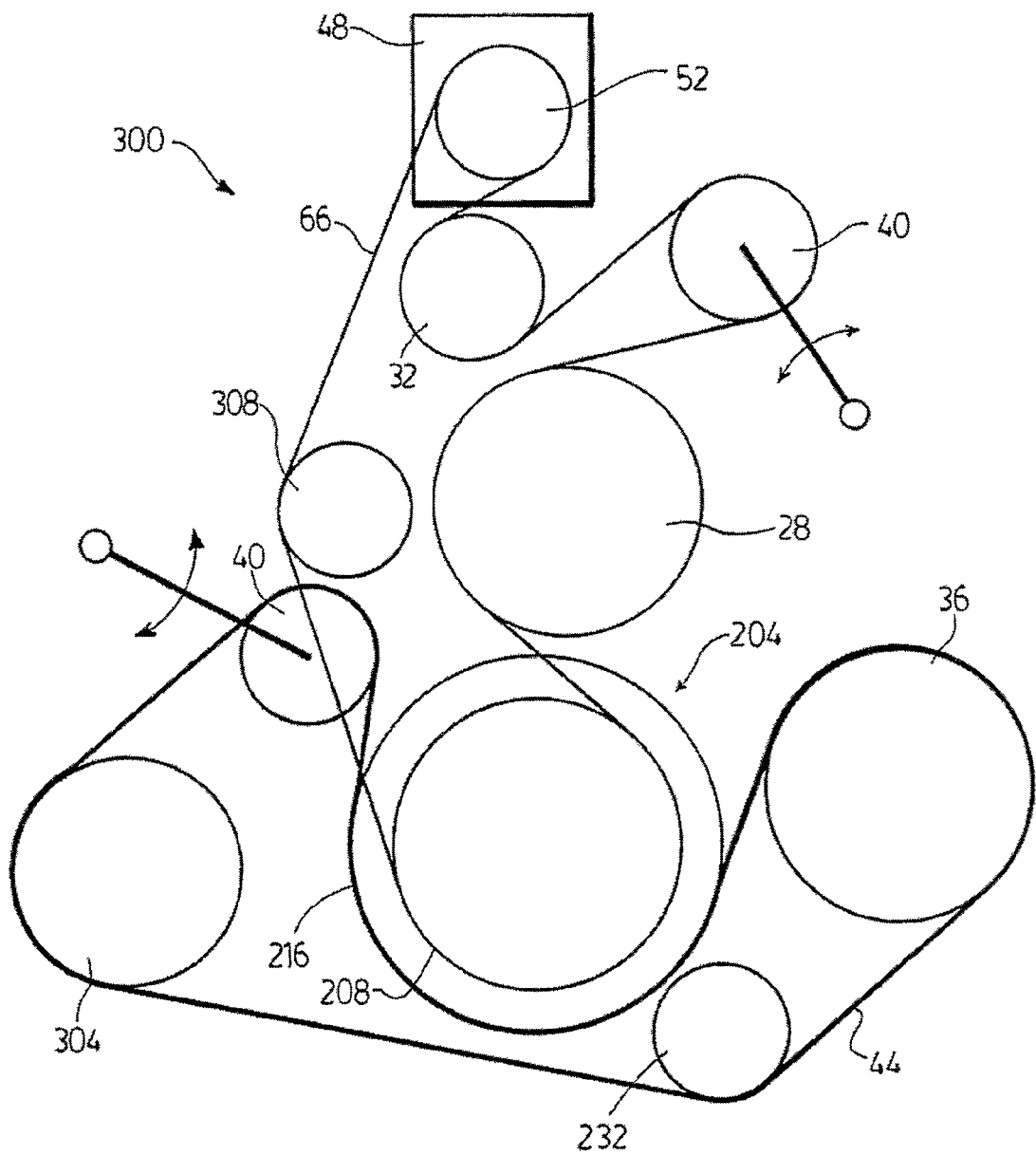
FIG. 6 shows a schematic representation of an alternative configuration of the accessory drive system of FIG. 3.

As will now be apparent to those of skill in the art, system 200, as shown in FIGS. 3 and 5, can be modified to include one or more accessories which are driven by drive motor 232, and thus may be operated independently of the engine, and one or more accessories which are driven by the engine and thus operate only when the engine is running. An example of such a FEAD system is indicated generally at 300 in FIG. 6, wherein like components to those of FIGS. 3 and 5 are indicated with like reference numerals. While the embodiment illustrated in FIG. 6 employs crankshaft pulley 204 to allow system 300 to be retrofit to an existing engine, it will be apparent to those of skill in the art that system 300 can be configured in a similar fashion to system 200 of FIG. 5 when it is not required or desired to employ crankshaft pulley 204.

As illustrated, in system 300 drive motor 232 generates torque which is transferred by flexible drive 44 to operate a subset of accessories, such as power steering pump 36 and an air conditioning compressor 304, which are required to be operated (for safety, comfort or other reasons) even when the engine is stopped. In contrast, flexible drive 66 is driven by the engine, via first flexible drive engaging surface 208 and operates the remaining accessories, such as water pump 28, alternator 32 and an engine cooling fan 308, which need only be operated when the engine is operating.

Figure 7:
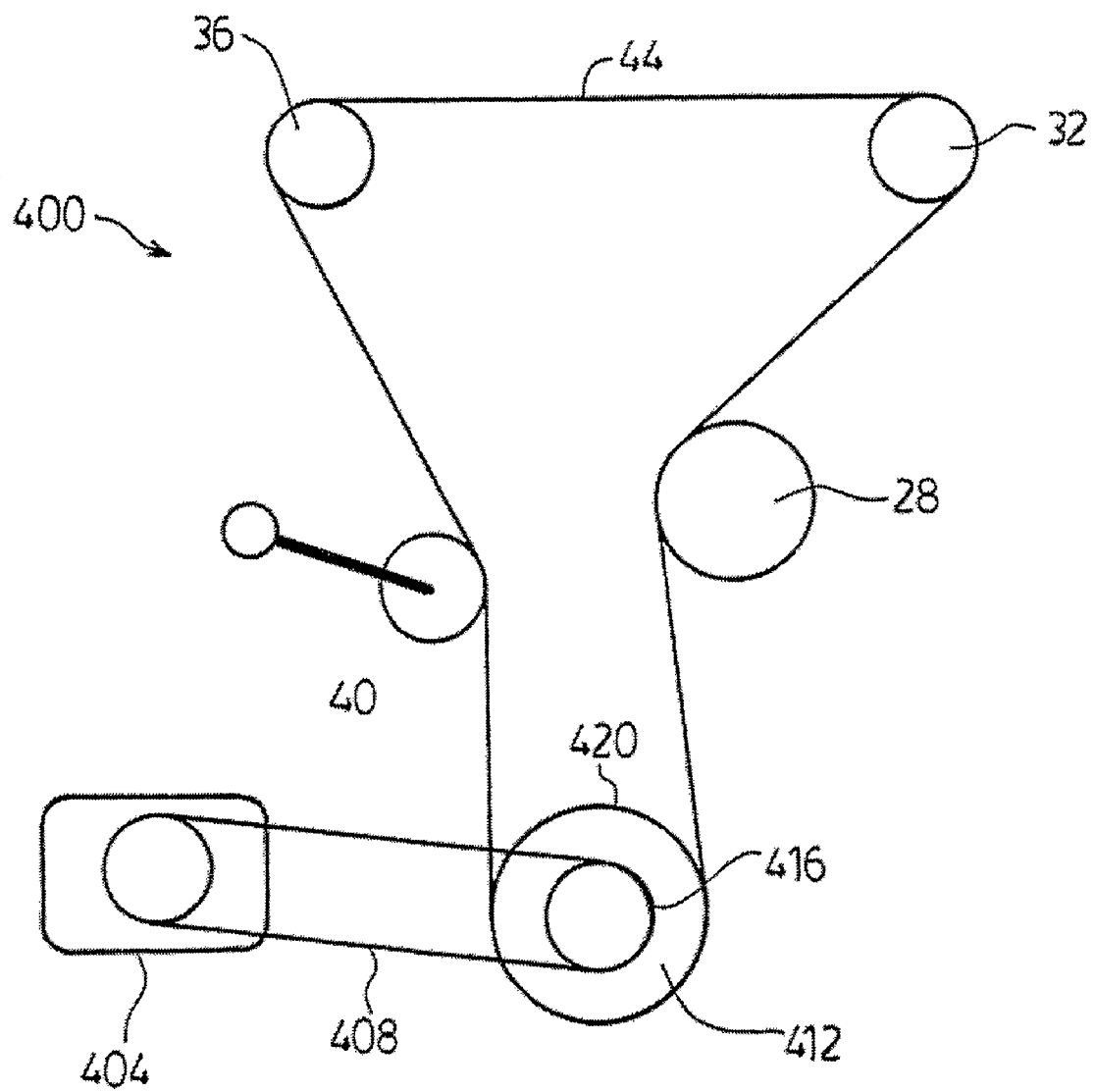
FIG. 7 shows a schematic representation of another accessory drive system in accordance with the present invention.

Yet another embodiment of the present invention is disclosed with reference to FIG. 7, where a FEAD system in accordance with the present invention is indicated generally at 400 and wherein like components to those of FIG. 1 are indicated with like reference numerals.

In system 400, the engine can be started and/or restarted by any appropriate manner, such as conventional starter and ring gear systems or a starter generator system, such as an electric "pancake" drive which is included as part of the transmission and/or drive line of the vehicle. While such a configuration does not suffer from the problems associated with the transfer of torque from the starter system to the crankshaft via a flexible drive, it still suffers from the stopping of the accessories when the engine is stopped.

Figure 8:
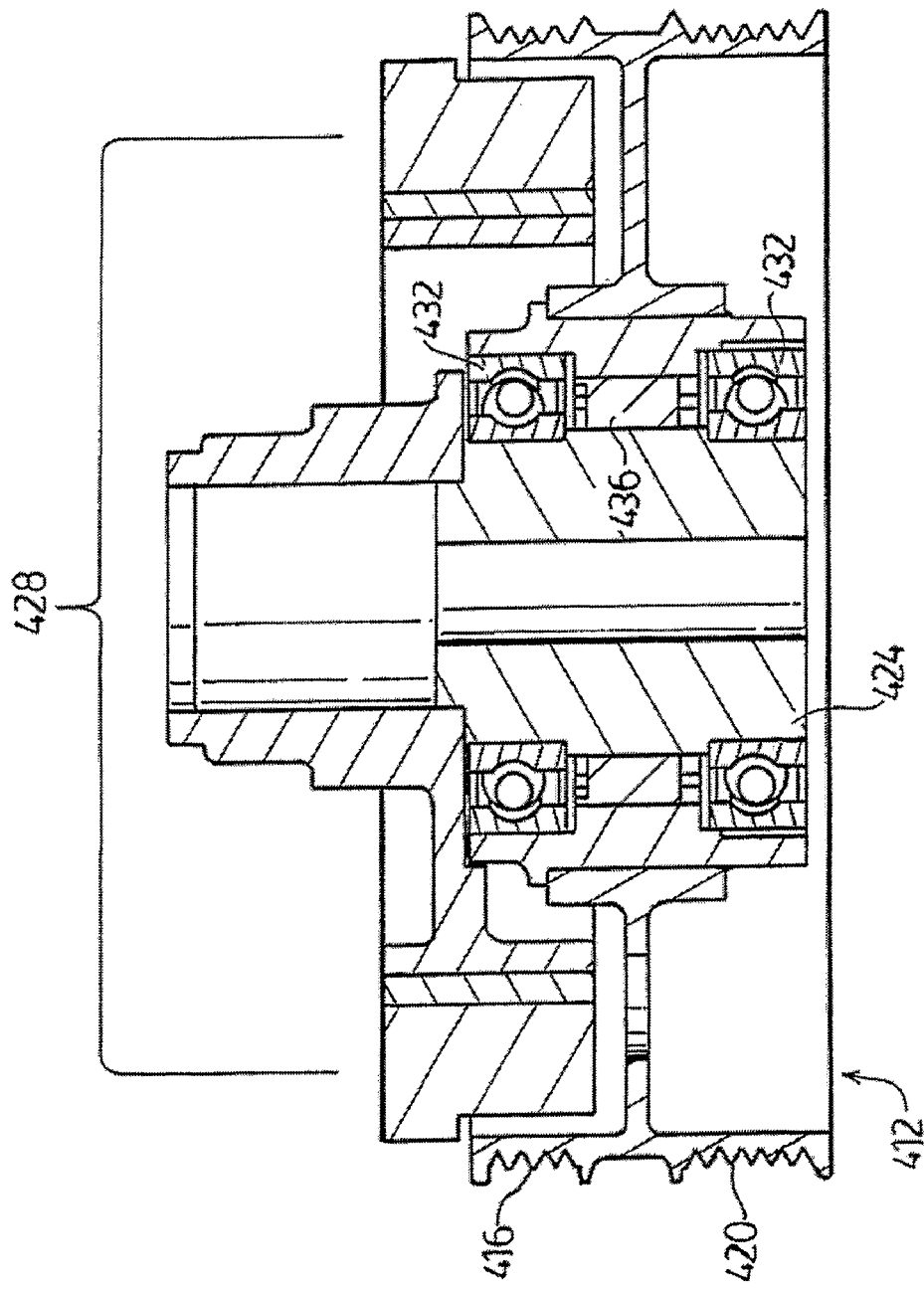
FIG. 8 shows a cross section through a crankshaft pulley of the accessory drive system of FIG. 7.

Accordingly, in system 400, an accessory drive 404, for example an electric or hydraulic motor, is provided to operate the accessories, as needed, when the engine is stopped. Accessory drive 404 produces torque which is transferred by a flexible drive 408 to a crankshaft pulley 412, shown in more detail in FIG. 8, and then to flexible drive 44.

Crankshaft pulley 412 includes a first flexible drive engaging surface 416 which engages flexible drive 408 and a second flexible drive engaging surface 420 which engages flexible drive 44. Crankshaft pulley 412 further includes a hub 424 which can be mounted to a torsional vibration dampener 428 such that, when torsional vibration dampener 428 and hub 424 are mounted to a crankshaft (not shown), with a suitable mounting bolt (also not shown), torsional vibration dampener 428 and hub 424 will rotate together with the crankshaft. Torsional vibration damper 428 can be a conventional dampener or can be a purpose built dampener.

A set of bearings 432 and a one-way clutch 436 connect hub 424 to first flexible drive engaging surface 416 and second flexible drive engaging surface 420. Bearings 432 and one way clutch 436 allow first flexible drive engaging surface 416 and second flexible drive engaging surface 420 to rotate independently of the crankshaft in one direction and to be locked to, and rotate with, the crankshaft in the opposite direction.

One way clutch 436 can be any suitable clutch mechanism such as a sprag clutch, a wire-wound spring overrunning clutch, etc., as will occur to those of skill in the art.

As should now be apparent, in system 400 when the engine is stopped, accessory drive 404 can be activated to transfer torque to first flexible drive engaging surface 416, via flexible drive 408. This torque is transferred to the accessories by flexible drive 44 via second flexible drive engaging surface 420 and one way clutch 436 operates to allow first flexible drive engaging surface 416 and second flexible drive engaging surface 420 to rotate independently of the stopped crankshaft.

When the engine is started, accessory drive 404 can be deactivated and one way clutch 436 operates to lock first flexible drive engaging surface 416 and second flexible drive engaging surface 420 to rotate with the crankshaft and the engine will provide the torque to power the accessories.

While not illustrated, it is also contemplated that system 400 can be modified if desired to include a starter motor, similar to starter 48, which can transfer torque to torsional vibration dampener 428 via a flexible drive similar to flexible drive 66, to start the engine.

Figure 9:
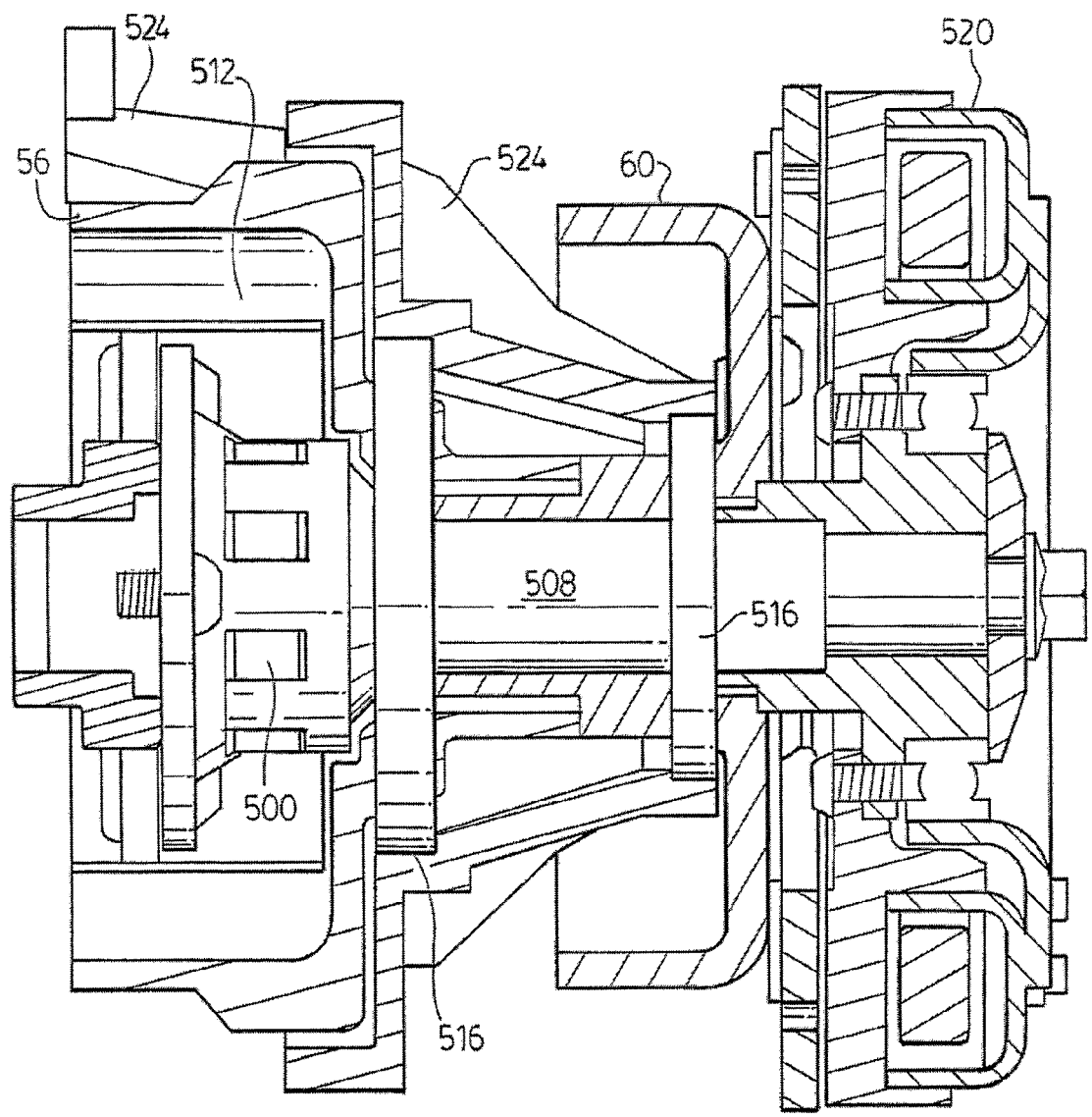
FIG. 9 shows a cross section of a crankshaft pulley useful with the present invention.
Figure 10:
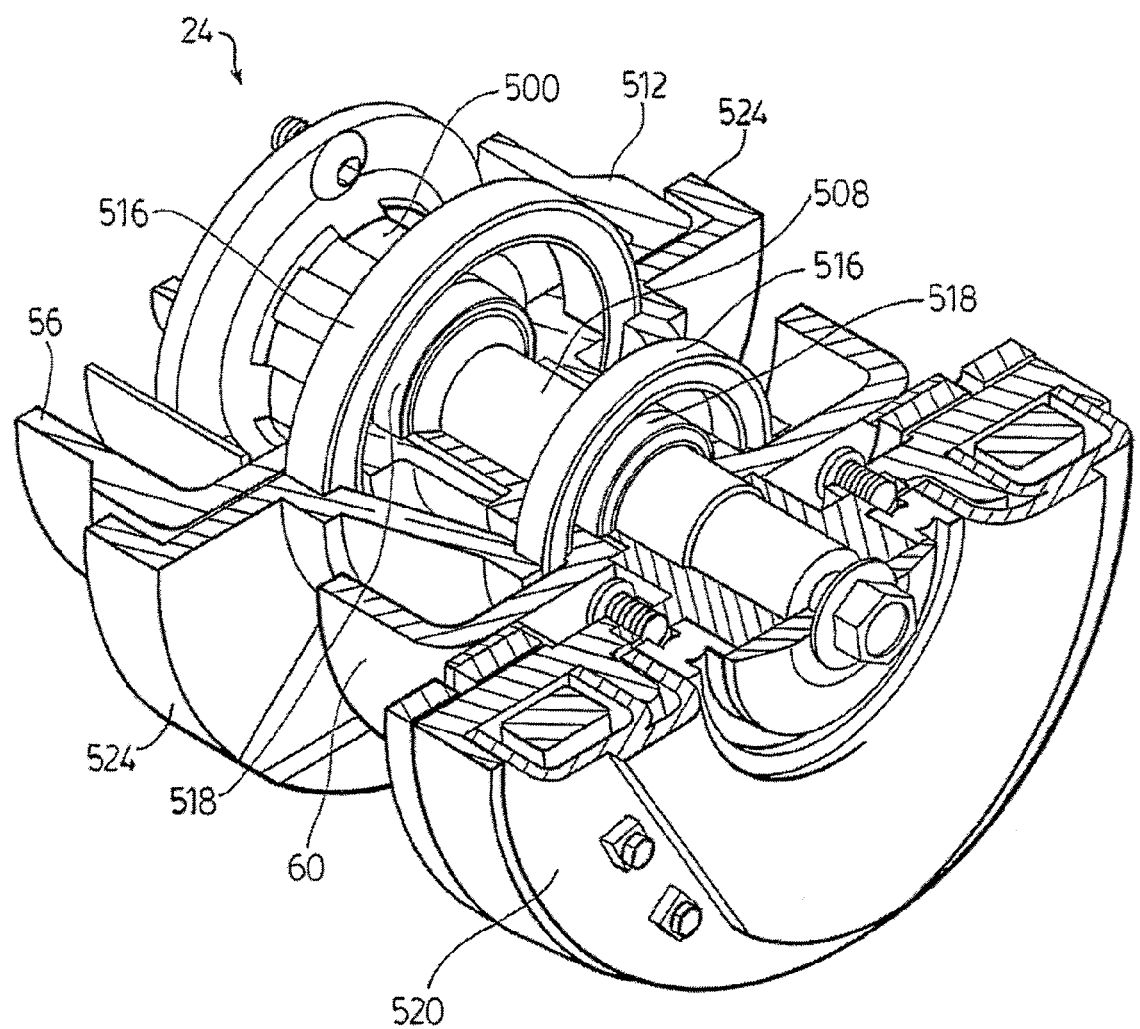
FIG. 10 shows a perspective cross sectional view of the crankshaft pulley of FIG. 9.

FIGS. 9 and 10 show an embodiment of crankshaft pulley 24 in accordance with the present invention. As shown, crankshaft pulley 24 includes a coupler 500 which couples the crankshaft of an engine to drive shaft 508 of crankshaft pulley 24 such that drive shaft 508 will rotate with the crankshaft. Preferably, coupler 500 provides for the ability to accommodate small misalignments between drive shaft 508 and the crankshaft. In a present embodiment of the invention, coupler 500 is an EK1 coupler, as sold by R+W America, 1120 Tower Lane, Bensenville, Ill., USA, but any other suitable coupler, as will occur to those of skill in the art, can be employed as desired. Crankshaft pulley 24 can also include a torsional vibration damper (not shown), if desired, and it is intended that such a torsional vibration damper could be accommodate at volume 512, within first flexible drive engagement surface 56.

First flexible drive engagement surface 56 and second flexible drive engagement surface 60 are fixed, with respect to one another, and are rotatably mounted to a mounting bracket 524 by a first set of bearings 516 which allow first flexible drive engagement surface 56 and second flexible drive engagement surface 60 to rotate independently of mounting bracket 524. A second set of bearings 518 (best seen in FIG. 10) acts between drive shaft 508 and mounting bracket 524 to allow drive shaft 508 to rotate independently of mounting bracket 524. Thus, first flexible drive engagement surface 56 and second flexible drive engagement surface 60 rotate together, but independent of drive shaft 508.

A suitable clutch mechanism 520 is affixed to drive shaft 508 and is operable to selectively engage the body of second flexible drive engagement surface 60 to lock drive shaft 508 to first flexible drive engagement surface 56 and second flexible drive engagement surface 60. Clutch mechanism 520 can be an electromagnetic clutch (as shown in the illustrated embodiment), under the control of an engine control unit (ECU) or the like, a centrifugal clutch or a one-way, overrunning and/or sprag clutch or any other clutch mechanism as will occur to those of skill in the art. Mounting bracket 524 allows crankshaft pulley 24 to be mounted to the front of the engine and supports first flexible drive engagement surface 56 and second flexible drive engagement surface 60, along with bearing sets 516 and 518, such that lateral forces resulting from flexible drive members 44 and 66 are not substantially applied to the crankshaft of the engine and are instead carried by mounting bracket 524 and are transferred to the front of the engine.

As should now be apparent, when clutch mechanism 520 is disengaged, first flexible drive engagement surface 56 and second flexible drive engagement surface 60 rotate together, independently of drive shaft 508 and the crankshaft. Thus, if torque from starter motor 48, or any other device, is transferred to second flexible drive engagement surface 60 by flexible drive 66 when crankshaft 504 is stationary, that torque will be transferred to first flexible drive engagement surface 56 and to flexible drive 44 to power the accessories connected to flexible drive 44.

If clutch mechanism 520 is engaged, first flexible drive engagement surface 56 and second flexible drive engagement surface 60 rotate together with drive shaft 508 and the crankshaft and, if the engine is running, the engine will provide the necessary torque to operate the accessories on flexible drive 44. As mentioned previously, if starter 48 is a starter/generator or starter/alternator, when clutch mechanism 520 is engaged, it can also be driven by the engine, via flexible drive 66, to produce electrical current. Alternatively, drive pulley 52 can be connected to starter 48 by a one-way clutch so that starter 48 does not rotate when clutch mechanism 520 is engaged.

Figure 11:
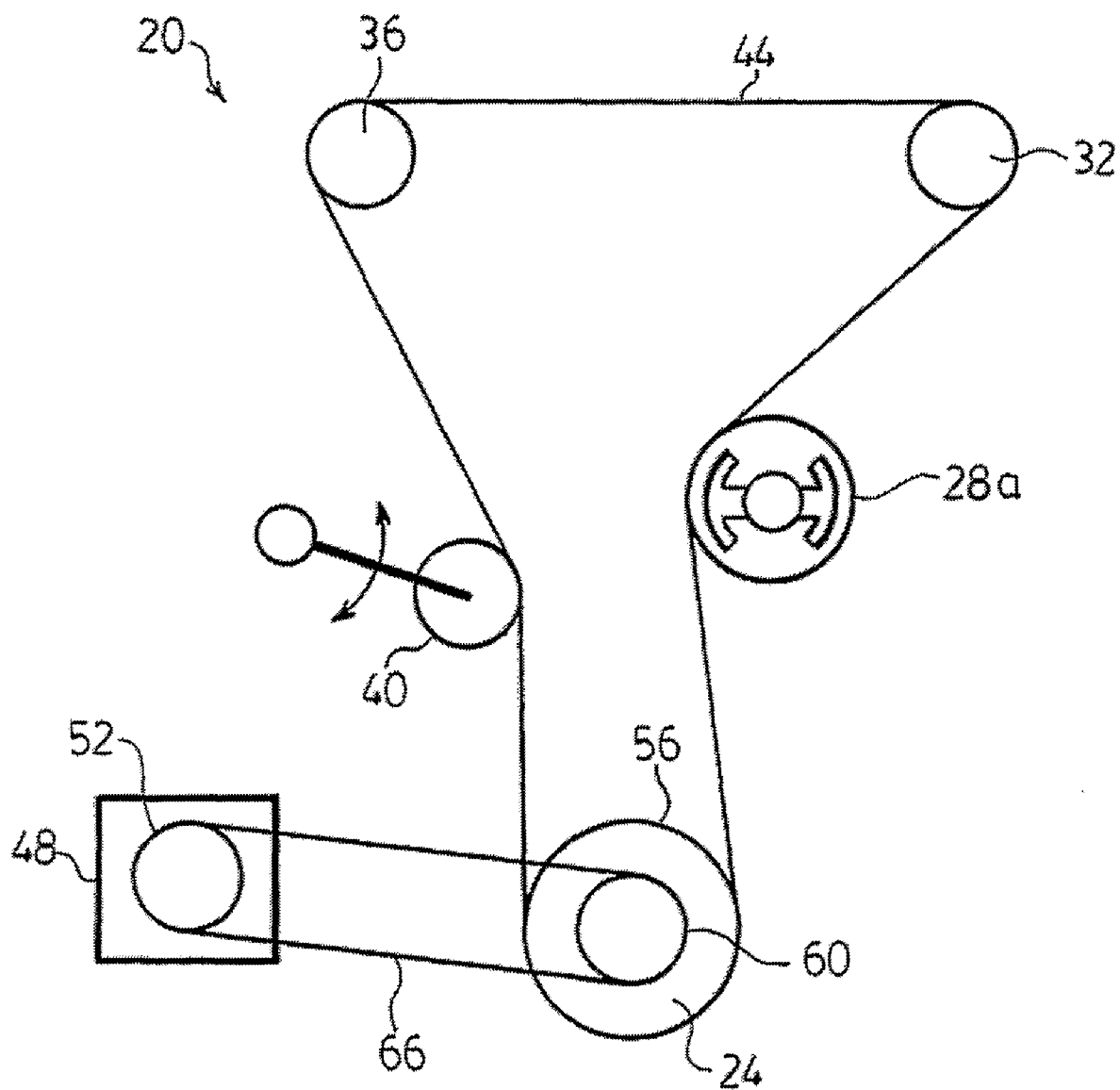
FIG. 11 shows a schematic representation of another accessory drive system in accordance with the present invention.

It is contemplated that, for the any of the above-described embodiments wherein the accessory drive can be driven independently of the crankshaft, that some accessories can be provided with centrifugal, or other, clutch mechanisms which allow for the accessory to be activated or deactivated from the accessory drive, as appropriate. FIG. 11 shows another embodiment of system 20 of FIG. 1 wherein water pump 28a is been equipped with a centrifugal clutch. As will be apparent to those of skill in the art, it is typically not required to operate the water pump of an engine when the engine is not operating. Accordingly, in this embodiment, when the engine is stopped and starter 48 is operating the accessories of the accessory drive (an appropriate clutch mechanism being in place on drive pulley 24 to permit independent operation of the accessory drive by starter 48), starter 48 is operated at a first speed such that flexible drive 44 rotates the accessories below the speed at which the centrifugal clutch of water pump 28a engages. In this manner, the other accessories of the accessory drive are powered by starter 48 while water pump 28a is not.

When the engine is re-started by starter 48, flexible drive 44 is rotated at a higher speed (by the engine in this example, but by an accessory drive motor in other embodiments) which exceeds the engagement speed of the centrifugal clutch of water pump 28a and thus water pump 28a is also driven by the accessory drive to circulate coolant in the engine as desired.

It is also contemplated that, in embodiments wherein the accessory drive is operated by a drive motor separate from the crankshaft, such as system 200 of FIG. 5, after a cold start of the engine, the drive motor for the accessory drive can be operated at a reduced speed, below the speed necessary to engage the centrifugal clutch of water pump 28, but sufficient to operate the accessories. In this manner, water pump 28 will not be operated while the engine is warming to a normal operating temperature. Once the normal operating temperature is achieved, the operating speed of the drive motor can be raised to engage the centrifugal clutch of water pump 28 for ongoing operation of the engine.

The present invention provides a novel starter and accessory drive system and method for hybrid drive vehicles is provided. Unlike the prior art, the present invention can isolate the accessory drive (FEAD or READ) system from the transfer of torque between a starter motor and the crankshaft of the engine. In one embodiment, a dedicated flexible drive member transfers torque from the starter motor to the crankshaft to re-start the engine. A clutch can be provided to disengage the starter motor from the crankshaft once the engine has started. In another embodiment, a torque transfer control (TTC) is employed to selectively apply torque from the starter motor to the accessory drive, to drive the accessories when the engine is stopped, and/or to the engine crankshaft to re-start the engine. The starter motor can be disengaged, once the engine has started, and the accessories can then be driven by the engine. In another embodiment of the invention, the accessory drive is isolated from the engine crankshaft and is instead driven by a drive motor on the accessory drive while the engine crankshaft is connected to a starter motor and/or generator which can be energized to re-start the engine.

The above-described embodiments of the invention are intended to be examples of the present invention and alterations and modifications may be effected thereto, by those of skill in the art, without departing from the scope of the invention which is defined solely by the claims appended hereto.

We claim:

1. A starter and accessory drive system for a vehicle employing a start-stop strategy, comprising:
   a drive pulley rotating with an engine of the vehicle;
   first and second accessories driven by a first flexible drive member engaging the drive pulley;
   a starter motor operable to create sufficient torque to rotate the engine to re-start the engine; and
   a second flexible drive member operable to transfer the torque produced by the starter motor to the drive pulley to re-start the engine,
   wherein the first accessory includes a first clutch configured to disengage the first accessory from the first flexible drive member when the first flexible drive member is operating below a predetermined speed and causes the first accessory to be engaged with the first flexible drive member when the first flexible drive member is operating above the predetermined speed.

2. The system of claim 1 further comprising a second clutch operable to disengage the second flexible drive member to prevent the transfer of torque from the engine to the starter motor when the engine is running.

3. The system of claim 1 wherein the starter motor is operable to generate an electric current when the engine is running.

4. The system of claim 1 wherein the drive pulley further comprises a second clutch which, when engaged, locks the drive pulley to rotate with the engine and, when disengaged, allows the pulley to rotate independently of the engine such that torque produced by the starter motor is transferred to at least one of the first and second accessories when the engine is stopped.

5. The system of claim 1 wherein the drive pulley is a crankshaft-mounted pulley.

6. The system of claim 1 wherein the drive pulley is a camshaft-mounted pulley.

7. The system of claim 1 wherein the drive pulley is connected to a pulley on the crankshaft by a third flexible drive member.

8. The system of claim 7 wherein the drive pulley includes second and third clutch mechanisms, the second clutch mechanism operable to selectively transfer torque between the second flexible drive member and the first flexible drive member and the third clutch mechanism operable to selectively transfer torque between the third flexible drive member and the first flexible drive member.

9. The system of claim 8 wherein the drive pulley further includes a fourth clutch mechanism operable to selectively transfer torque between the first flexible drive member and the second flexible drive member.

10. The system of claim 7 further comprising at least a third accessory, the third accessory driven by the third flexible drive member.

11. The system of claim 10 wherein the first flexible drive member is a belt.

12. The system of claim 11 wherein the second flexible drive member is a belt.

13. The system of claim 12 wherein the first flexible drive member is part of a front engine accessory drive.

14. The system of claim 1 wherein the first flexible drive member is part of a rear engine accessory drive.

15. The system of claim 1 wherein the first accessory is a water pump, and wherein the second accessory is engaged with the first flexible drive member when the first accessory is disengaged from the first flexible drive member.

16. A starter and accessory drive system for a vehicle employing a start-stop strategy, comprising:
    a drive pulley rotating with an engine;
    a starter motor operable to create sufficient torque to rotate the engine to re-start the engine;
    at least one accessory driven by a first flexible drive member; and
    a torque transfer and control member including a first surface to engage the first flexible drive member, a second surface to engage a second flexible drive member rotating with the drive pulley and a third surface to engage a third flexible drive member to receive torque produced by the starter motor, the first surface rotating with the second surface and the torque transfer and control including a clutch to lock the rotation of the second surface to the rotation of the first surface when engaged to allow the second surface to rotate independently of the first surface and the third surface when disengaged, the starter motor providing torque to drive the accessory when the engine is stopped and the clutch is disengaged and providing torque to re-start the engine when the clutch is engaged.

17. The system of claim 16 further comprising a second clutch operable to disengage the third flexible drive means to prevent the transfer of torque from the engine to the starter motor when the engine is running.

18. A system for re-starting an internal combustion engine used with a hybrid drive vehicle employing a start-stop strategy, comprising:
    a drive pulley including a first surface to engage a first flexible drive member, the first surface rotating with the internal combustion engine, and a second surface to engage a second flexible drive member, the second surface rotating independently of the rotation of the engine;
    at least one accessory driven by the second flexible drive member; and
    an electric drive motor operable to produce torque to drive the at least one accessory via the second flexible drive member independent of the operation of the internal combustion engine; and
    a starter motor operable to create sufficient torque to rotate the internal combustion engine to re-start the internal combustion engine, the torque being transferred from the starter motor to the drive pulley via the first flexible drive member.

19. The system of claim 18 further comprising at least one accessory which is to be operated only when the internal combustion engine is operating, the at least one accessory engaging the first flexible drive member.

20. A system for re-starting an internal combustion engine used with a hybrid drive vehicle employing a start-stop strategy, comprising:
    a crankshaft drive pulley rotating with the internal combustion engine;
    a starter motor operable to create sufficient torque to rotate the internal combustion engine to re-start the internal combustion engine, the torque being transferred from the starter motor to the crankshaft drive pulley via a first flexible drive member;
    at least one accessory to be operated when the internal combustion engine is stopped, the at least one accessory engaging a second flexible drive member; and
    an electric drive motor operable to produce torque to drive the at least one accessory via the second flexible drive member independent of the operation of the internal combustion engine.

21. A system for a hybrid vehicle comprising:
    a drive pulley rotating with an engine of the hybrid vehicle;

at least one accessory driven by a first flexible drive member engaging the drive pulley;

a starter motor operable to create sufficient torque to rotate the engine to re-start the engine; and a second flexible drive member operable to transfer the torque produced by the starter motor to the drive pulley to re-start the engine, wherein the drive pulley is connected to a pulley on the crankshaft by a third flexible drive member, and wherein the drive pulley includes first and second clutch mechanisms, the first clutch mechanism operable to selectively transfer torque between the second flexible drive member and the first flexible drive member and the second clutch mechanism operable to selectively transfer torque between the third flexible drive member and the first flexible drive member.

* * * * *